(12) United States Patent
Mertes (10) Patent No.: US 12,286,235 B2
(45) Date of Patent: Apr. 29, 2025

(54) FASTENING SYSTEM FOR AN AIRCRAFT INTENDED TO FASTEN AT LEAST ONE TANK INTENDED TO CONTAIN LIQUID HYDROGEN, ALLOWING EASY ACCESS TO THE TANK

(71) Applicant: Airbus Operations (S.A.S.), Toulouse (FR)

(72) Inventor: Anthony Mertes, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 18/385,003

(22) Filed: Oct. 30, 2023

(65) Prior Publication Data

US 2024/0150032 A1  May 9, 2024

(30) Foreign Application Priority Data

Nov. 8, 2022 (FR) ...................................... 2211631

(51) Int. Cl.
*B64D 37/04* (2006.01)
*B64D 37/30* (2006.01)
*F17C 13/08* (2006.01)

(52) U.S. Cl.
CPC ............. *B64D 37/04* (2013.01); *B64D 37/30* (2013.01); *F17C 13/08* (2013.01); *F17C 2205/0103* (2013.01); *F17C 2270/0189* (2013.01)

(58) Field of Classification Search
CPC . B64D 37/04; B64D 37/30; F17C 2205/0103; F17C 2205/0107; F17C 2270/0189
See application file for complete search history.

(56) References Cited

U.S. PATENT DOCUMENTS

| | | | | |
|---|---|---|---|---|
| 3,225,953 A | * | 12/1965 | Wolfe | B65D 88/06 220/4.12 |
| 3,251,501 A | * | 5/1966 | Mesnager | B60P 3/222 220/560.05 |
| 10,345,134 B2 | * | 7/2019 | Vander Putten | G01G 17/04 |
| 2015/0360791 A1 | | 12/2015 | Chevrollier | |
| 2022/0289401 A1 | | 9/2022 | Heck | |
| 2024/0270401 A1 | * | 8/2024 | Kondo | B64C 1/0685 |

FOREIGN PATENT DOCUMENTS

| | | | | |
|---|---|---|---|---|
| EP | 3524526 B1 | 6/2021 | | |
| WO | WO-2015162404 A1 | * | 10/2015 | B23P 19/102 |

OTHER PUBLICATIONS

French Search Report for Application No. 2211631 dated May 12, 2023.

* cited by examiner

*Primary Examiner* — Philip J Bonzell
*Assistant Examiner* — Anna L. Gordon
(74) *Attorney, Agent, or Firm* — KDW Firm PLLC (57) ABSTRACT

A fastening system for an aircraft to fasten at least one tank to contain liquid hydrogen, allowing easy access to the tank. The fastening system includes a longitudinal box, upper formers fastened to the upper end of the longitudinal box and lower formers fastened to the lower end of the longitudinal box, at least two upper formers including two fastening devices to each connect a fastening point of the tank to an upper former, at least one lower former including two second fastening devices to each connect a second fastening point of the tank to the lower former. The fastening system allows an operator to access the tanks that are capable of being fastened by the fastening system.

15 Claims, 5 Drawing Sheets

FASTENING SYSTEM FOR AN AIRCRAFT INTENDED TO FASTEN AT LEAST ONE TANK INTENDED TO CONTAIN LIQUID HYDROGEN, ALLOWING EASY ACCESS TO THE TANK

TECHNICAL FIELD

The disclosure herein relates to a fastening system for an aircraft configured to fasten at least one tank intended to contain liquid hydrogen. This system allows easy access to the tank by an operator.

BACKGROUND

In order to move, an aircraft comprises propulsion systems comprising at least one engine. The propulsion systems may correspond to turbojet engines or turboprop engines in which an engine drives a propeller in rotation.

The engines of these propulsion systems may correspond to internal combustion engines supplied by liquid hydrogen. These engines may also correspond to electric motors supplied by fuel cells. In order to power these engines, it is necessary to install liquid hydrogen tanks.

These tanks may be installed one next to the other in a fuselage portion of the aircraft. To be installed on board the aircraft, the tanks have to be fastened securely. Furthermore, it may be necessary for the recess or recesses in which the tanks are installed to be sufficiently large to facilitate the fastening of the tank or tanks by an operator and/or maintenance of the fastening of the tank or tanks.

SUMMARY

An object of the disclosure herein is to provide a solution for the fastening of tanks installed on board the aircraft while still allowing access to the tanks by an operator.

To this end, the disclosure herein relates to a fastening system configured to fasten at least one tank intended to contain liquid hydrogen, the tank or tanks having a center of gravity, the fastening system being intended to be integrated into a fuselage body of an aircraft, the fastening system being linked to an orthogonal frame of reference defined by an axis X intended to be parallel to a longitudinal axis of the fuselage body, a horizontal axis Y and a vertical axis Z, the fastening system having a vertical plane of symmetry perpendicular to the axis Y.

According to the disclosure herein, the fastening system comprises:
  a longitudinal box extending parallel to the axis X and having a plane of symmetry that is coincident with the vertical plane of symmetry,
  a plurality of upper formers perpendicular to the axis X and fastened to an upper end of the longitudinal box, the upper formers of the plurality of upper formers being distributed along the axis X, the plurality of upper formers comprising at least two fastening upper formers each having two fastening devices on either side of the longitudinal box in order to each connect a first fastening point of at least one tank to the fastening upper formers by a sliding pivot connection of pivot axis parallel to the axis X, the pivot axis being configured to be comprised in a plane perpendicular to the axis Y comprising the center of gravity of the tank,
  a plurality of lower formers perpendicular to the axis X and fastened to a lower end of the longitudinal box, the lower formers of the plurality of lower formers being distributed along the axis X, the plurality of lower formers comprising at least one fastening lower former having two second fastening devices on either side of the longitudinal box in order to each connect a second fastening point of the tank or tanks to the fastening lower former or formers, the first fastening point and the second fastening point of a tank being capable of being comprised in a plane perpendicular to the axis Y and comprising the center of gravity of the tank.

Thus, the recess defined between the upper formers, on the one hand, and the lower formers, on the other hand, is enlarged with respect to a recess of the prior art, thus facilitating the integration of the tank or tanks and maintenance of the fastening of the tank or tanks.

According to a particular feature, the fastening system comprises two upper panels extending parallel to the axis X and perpendicular to the axis Z, the two upper panels being disposed symmetrically with respect to the vertical plane of symmetry on either side of the longitudinal box, each of the two upper panels being fastened to the upper formers.

Furthermore, the fastening system comprises at least two third fastening devices fastened to the two upper panels symmetrically with respect to the vertical plane of symmetry, the at least two third fastening devices being configured to each connect a respective third fastening point of the tank to an upper panel.

According to another particular feature, the fastening system comprises two lower panels extending parallel to the axis X and perpendicular to the axis Z, the two lower panels being disposed symmetrically with respect to the vertical plane of symmetry on either side of the longitudinal box, each of the two lower panels being fastened to the lower formers.

Advantageously, the fastening system further comprises two upper longerons extending parallel to the axis X and disposed symmetrically on either side of the vertical plane of symmetry, each of the upper formers having a longitudinal end on each side of the vertical plane of symmetry, each of the two upper longerons being fastened to each end of the upper formers that is situated on the same side of the vertical plane of symmetry.

In addition, the fastening system further comprises two lower longerons extending parallel to the axis X and disposed symmetrically on either side of the vertical plane of symmetry, each of the lower formers having a longitudinal end on each side of the vertical plane of symmetry, each of the two lower longerons being fastened to each end of the lower formers that is situated on the same side of the vertical plane of symmetry.

Furthermore, each of the two first fastening devices comprises a double fastening plate perpendicular to the axis X, the double fastening plate is pierced with an orifice allowing the passage of the pivot axis, the double fastening plate being fastened to an end of a fastening upper former.

In addition, each of the two second fastening devices comprises:
  a first triangular double plate comprised in a vertical plane perpendicular to the axis X, the first triangular double plate being fastened to a fastening lower former by a fastening side of the first triangular double plate, the fastening side being opposite to a fastening vertex of the first triangular double plate,
  two first double link rods parallel to the axis Y, the two first double link rods having a first end connected to the fastening vertex by a first pivot connection of axis X, the two first double link rods having a second end intended to be connected to the tank by a second pivot connection of axis X.

In addition, each of the two third fastening devices comprises:
- a second triangular double plate comprised in a vertical plane perpendicular to the axis Y, the second triangular double plate being fastened to the upper panel by a fastening side of the second triangular double plate, the fastening side being opposite to a fastening vertex of the second triangular double plate,
- two second double link rods parallel to the axis X, the two second double link rods having a first end connected to the fastening vertex by a first pivot connection of axis Y, the two second double link rods having a second end intended to be connected to the tank by a second pivot connection of axis Y.

Furthermore, the longitudinal box comprises at least two longitudinal plates that are parallel to the vertical plane of symmetry and that are symmetrical to one another with respect to the vertical plane of symmetry.

According to one embodiment, each of the upper formers comprises a pair of upper half-formers fastened to the longitudinal box symmetrically on either side of the vertical plane of symmetry and an upper former center fastened between the upper half-formers and between the two longitudinal plates, each of the lower formers comprising a pair of lower half-formers fastened to the longitudinal box symmetrically on either side of the vertical plane of symmetry and a lower former center fastened between the lower half-formers and between the two longitudinal plates.

Furthermore, the upper half-former of each of the pairs of upper half-formers comprises, in a vertical plane perpendicular to the vertical plane of symmetry, a vertical upright, a horizontal crossmember, a spacer and a curved beam,
- the vertical upright being fastened to a longitudinal plate of the longitudinal box, the curved beam extending from the upper end of the vertical upright,
- the curved beam being configured to conform to an inner surface of an upper shell of the fuselage body of the aircraft and to be fastened to the inner surface,
- the horizontal crossmember extending from the lower end of the vertical upright,
- the curved beam and the horizontal crossmember approaching one another in the direction away from the longitudinal box and are connected to one another by way of the spacer,
- each of the two upper longerons being fastened to the spacer of each of the upper half-formers that is situated on the same side of the vertical plane of symmetry,
- each of the two upper panels being fastened to the horizontal crossmember of each of the upper half-formers that are situated on the same side of the vertical plane of symmetry,
- the upper former center of each of the upper formers having a rectangular shape, two opposite sides of which are fastened respectively to a longitudinal plate of the longitudinal box such that an upper end of the vertical upright is at the height of an upper side of the upper former center and a lower end of the vertical upright is at the height of a lower side of the upper former center.

In addition, the lower half-former of each of the pairs of lower half-formers comprises, in a vertical plane perpendicular to the vertical plane of symmetry, a horizontal crossmember and a curved beam,
- the lower former center of each of the lower formers having a rectangular shape, two opposite sides of which are fastened respectively to a longitudinal plate of the longitudinal box between the two longitudinal plates,
- the curved beam having a first end fastened to a longitudinal plate of the longitudinal box at the height of a lower side of the lower former center, the curved beam being configured to conform to an inner surface of a lower shell of the fuselage body of the aircraft and to be fastened to the inner surface,
- the horizontal crossmember having a first end fastened to the longitudinal plate of the longitudinal box at the height of an upper side of the lower former center,
- the curved beam and the horizontal crossmember approaching one another in the direction away from their respective first end and are connected to one another at their second end by way of the lower longeron situated on the same side of the vertical plane of symmetry,
- each of the two lower panels being fastened to the horizontal crossmember of each of the lower half-formers that are situated on the same side of the vertical plane of symmetry.

The disclosure herein also relates to an aircraft, in particular a transport plane, into which a fastening system such as specified above is integrated.

Furthermore, the aircraft comprises at least one tank intended to contain liquid hydrogen, the tank or tanks being fastened to the fastening system.

BRIEF DESCRIPTION OF THE DRAWINGS

The appended figures will make it easy to understand how the disclosure herein may be implemented. In these figures, identical references denote similar elements.

DETAILED DESCRIPTION

Figure 1:
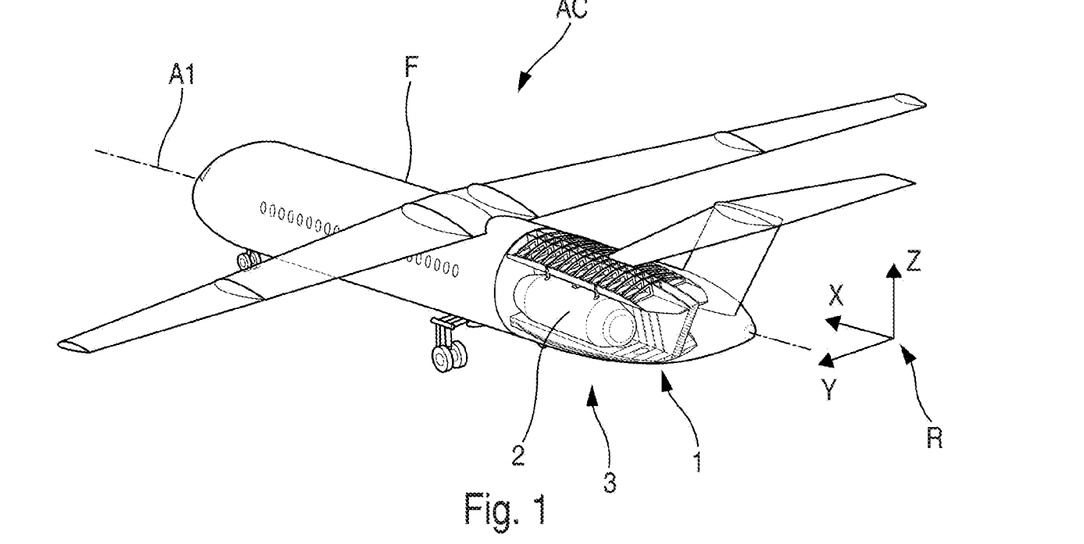
FIG. 1 shows a perspective view of an aircraft having a fuselage into which a fastening system to which two tanks are fastened is integrated.

The fastening system 1 is intended to be integrated into the fuselage F of an aircraft AC (FIG. 1). The fastening system 1 may be secured to the fuselage F of the aircraft AC.

Figure 2:
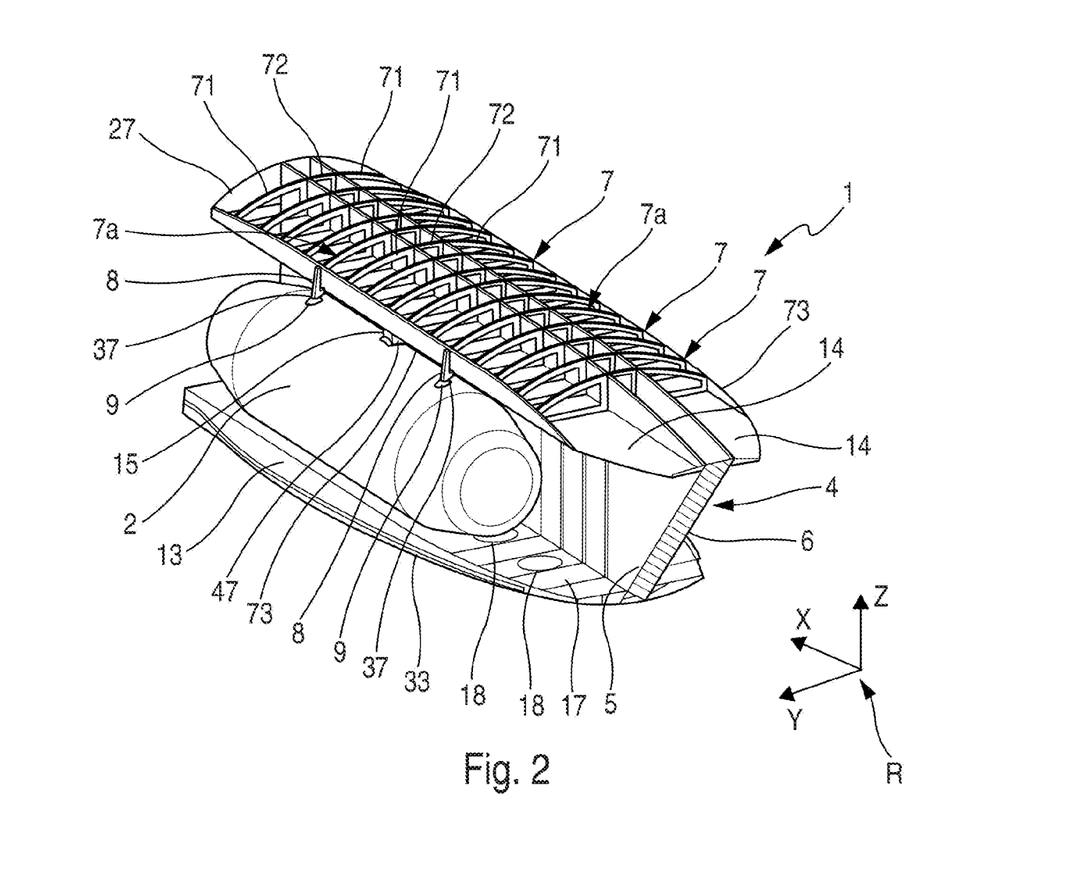
FIG. 2 shows a perspective view of a fastening system to which two tanks are fastened.
Figure 5:
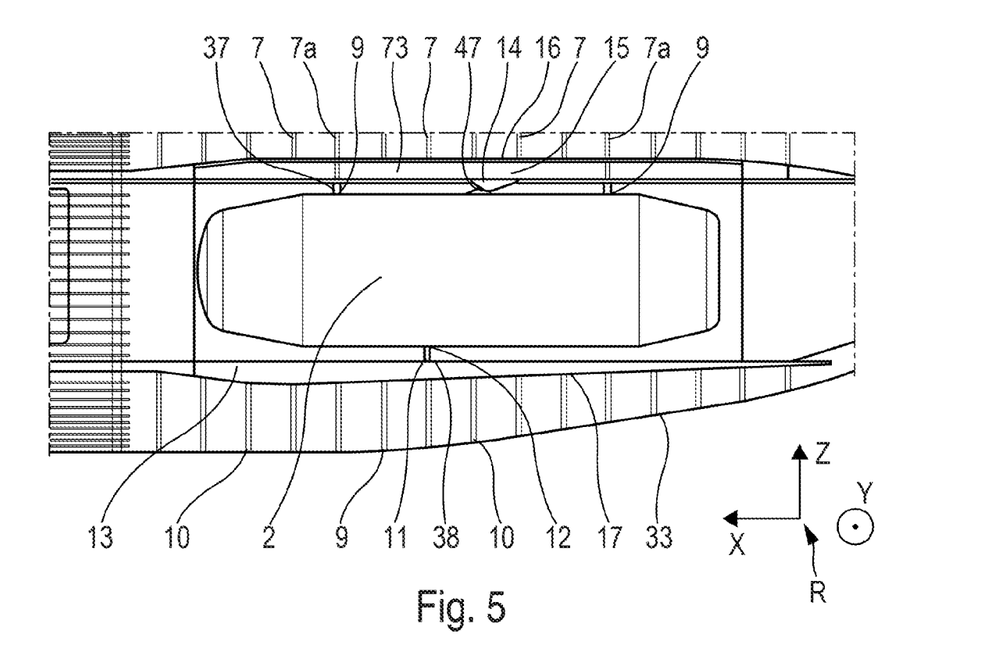
FIG. 5 shows a profile view of the fastening system to which a tank is fastened.

The fastening system 1 shown in FIG. 2 and FIG. 5 is linked to an orthogonal frame of reference R defined by an axis X intended to be parallel to a longitudinal axis A1 of the fuselage body 3 of the aircraft AC, into which fuselage body the fastening system 1 is intended to be integrated (FIG. 1). The orthogonal frame of reference R is also defined by an axis Y and an axis Z. The axis Y corresponds to a transverse direction of the fastening system 1 perpendicular to the axis X. The axis Y is horizontal when the aircraft AC that is intended to receive the fuselage body 3 into which the fastening system 1 is integrated is on the ground. The axis Z corresponds to the vertical direction of the fastening system 1 perpendicular to the axis X and to the axis Y. The fastening system 1 comprises a vertical plane of symmetry P1. "Vertical plane of symmetry P1" refers to the plane parallel to the axis X and to the axis Z (or the plane perpendicular to the axis Y) which corresponds to the vertical plane of symmetry of the fastening system 1.

The adjectives "upper" and "lower" are defined with respect to the ground along which the aircraft AC intended to receive the fastening system 1 is capable of advancing. An object qualified by the adjective "lower" is situated closer to the ground than the same object qualified by the adjective "upper".

The fastening system 1 is configured to fasten at least one tank 2 intended to contain liquid hydrogen. The fastening system 1 provides that two tanks 2 can be fastened one next to the other on either side of the vertical plane of symmetry P1. The tank or tanks 2 have a center of gravity CG. It can be considered that the center of gravity CG of the or of each of the tanks 2 remains substantially in the same position irrespective of the quantity of liquid hydrogen contained in the tank or tanks 2.

The fastening system 1 is intended to be integrated into a fuselage body 3 of an aircraft AC.

As shown in FIG. 2, the fastening system 1 comprises at least one longitudinal box 4, a plurality of upper formers 7 and a plurality of lower formers 10.

The longitudinal box 4 extends parallel to the axis X and has a plane of symmetry that is coincident with the vertical plane of symmetry P1. The longitudinal box 4 may extend over the entire length of the fastening system 1 along the axis X.

Each of the upper formers 7 of the plurality of upper formers 7 is perpendicular to the axis X. Each of the upper formers 7 is fastened to an upper end of the longitudinal box 4. The upper formers 7 of the plurality of upper formers 7 are distributed along the axis X.

The plurality of upper formers 7 comprises at least two fastening upper formers 7a each having two fastening devices 8 situated on either side of the longitudinal box 4 in order to each connect a first fastening point 9 of at least one tank 2 to the fastening upper formers 7a. The first fastening devices 8 may be disposed symmetrically on either side of the vertical plane of symmetry P1.

Figure 6:
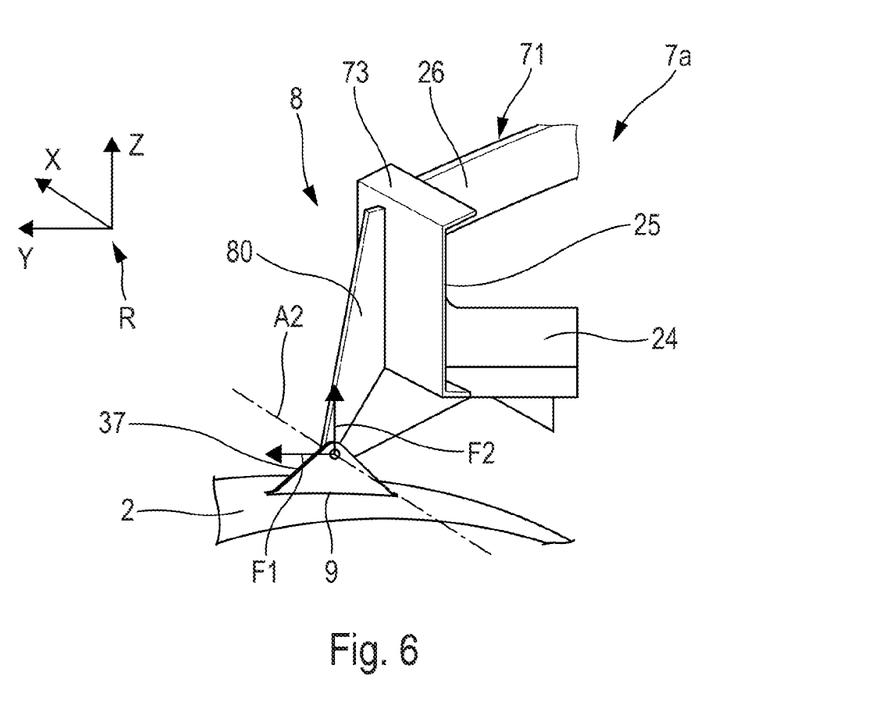
FIG. 6 shows a perspective view of the first fastening device.

Preferably, each of the two first fastening devices 8 is configured to connect the tank or tanks 2 to a fastening upper former 7a by a sliding pivot connection of pivot axis A2 parallel to the axis X. The pivot axis A2 is configured to be comprised in a plane perpendicular to the axis Y comprising the center of gravity CG of the tank 2. Each of the two first fastening devices 8 is configured to permit a transfer of load F1 and F2 (FIG. 6) along the axis Y and the axis Z, respectively.

Each of the lower formers 10 of the plurality of lower formers 10 is perpendicular to the axis X. Each of the lower formers 10 is fastened to a lower end of the longitudinal box 4. The lower formers 10 of the plurality of lower formers are distributed along the axis X.

Figure 7:
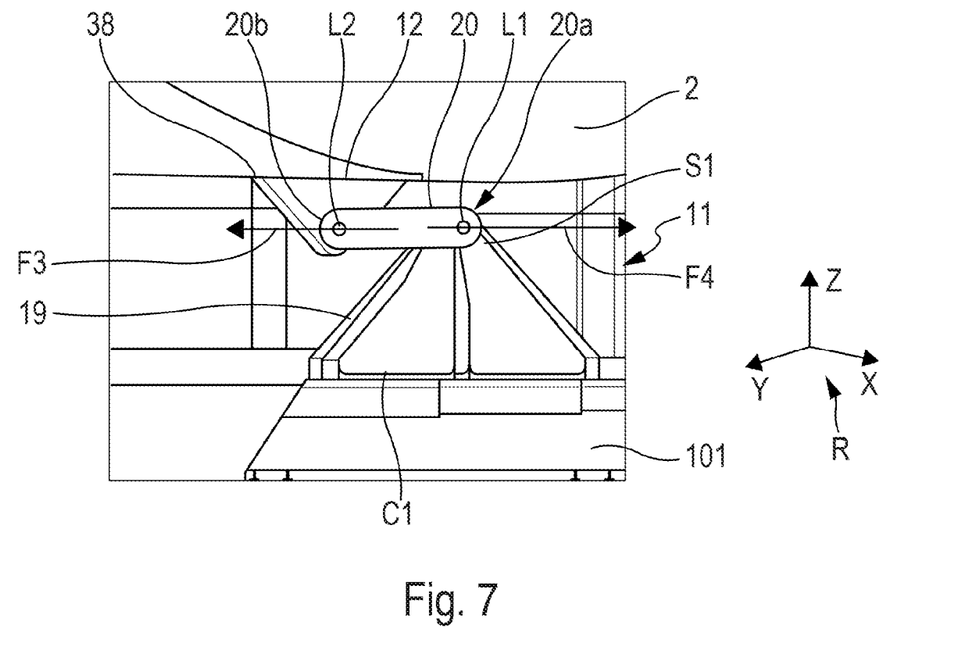
FIG. 7 shows a perspective view of the second fastening device.

The plurality of lower formers 10 comprises at least one fastening lower former 10a having two second fastening devices 11 on either side of the longitudinal box 4 in order to each connect a second fastening point 12 of the tank or tanks 2 to the fastening lower former or formers 10a. The second fastening devices 11 may be disposed symmetrically on either side of the vertical plane of symmetry P1. Each of the two second fastening devices 11 is configured to permit a transfer of loads F3, F4 along the axis Y (FIG. 7).

Figure 3:
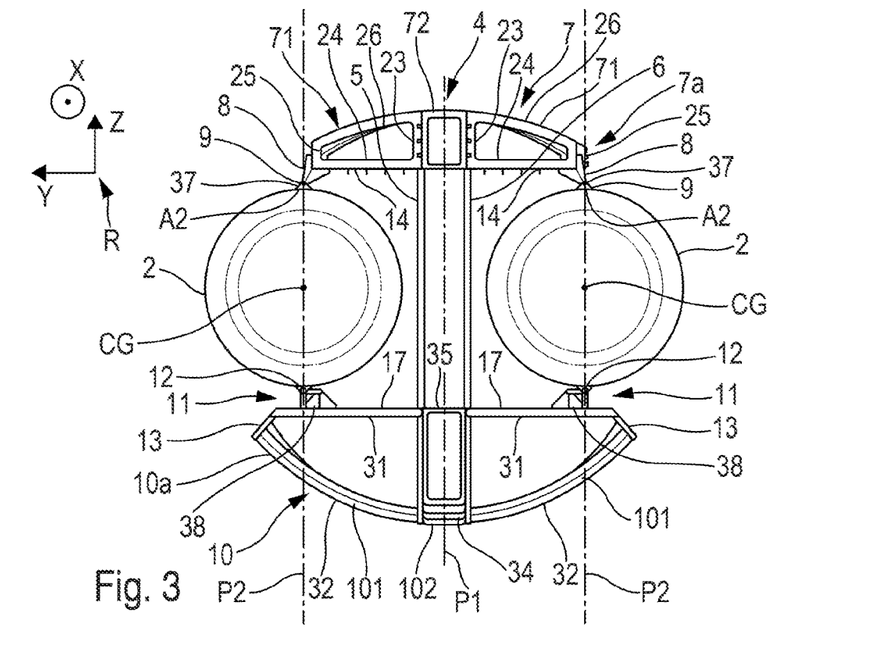
FIG. 3 shows a rear view of the fastening system.
Figure 4:
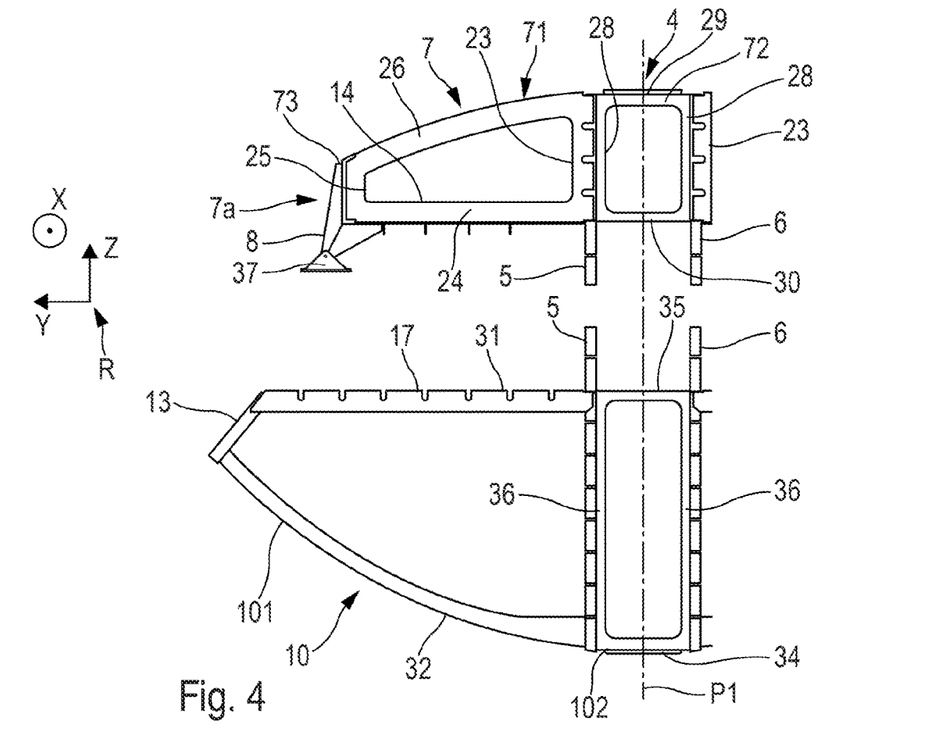
FIG. 4 shows a rear view of part of a fastening upper former and of a fastening lower former.

The first fastening point 9 and the second fastening point 12 of a tank 2 are capable of being comprised in a plane P2 perpendicular to the axis Y and comprising the center of gravity CG of the tank 2 (FIG. 3). Advantageously, the first fastening point 9 is situated in an upper part of the tank 2. The second fastening point 12 is situated in a lower part of the tank 2.

In a non-limiting manner, the recess defined between the upper formers 7, on the one hand, and the lower formers 10, on the other hand, allows a gap of at least 200 mm around the tank or tanks 2 when it or they are fastened to the fastening system 1.

In addition, the fastening system 1 may comprise two upper panels 14 extending parallel to the axis X and perpendicular to the axis Z. The two upper panels 14 are disposed symmetrically with respect to the vertical plane of symmetry P1 on either side of the longitudinal box 4. The two upper panels 14 extend over the entire length of the fastening system 1 along the axis X. Each of the two upper panels 14 is fastened to the upper formers 71.

Figure 10:
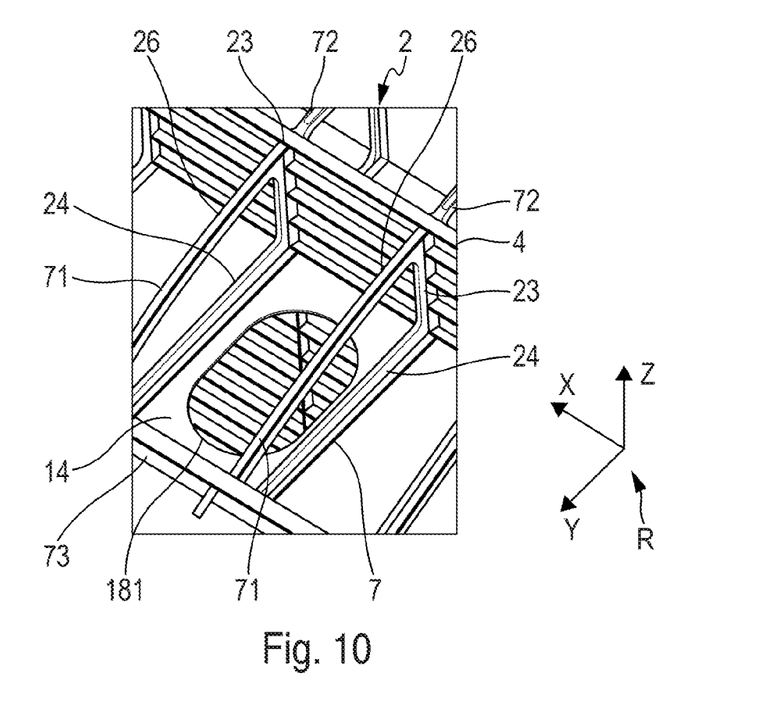
FIG. 10 shows a perspective view of an upper panel.

As shown in FIG. 10, the two upper panels 14 may each comprise at least one manhole 181 configured to allow an operator to pass through on either side of each of the two upper panels 14. As shown in FIG. 10, the manhole 181 is, preferably, arranged between two upper formers 7.

The fastening system 1 may also comprise two lower panel 17 extending parallel to the axis X and perpendicular to the axis Z, the two lower panels 17 are disposed symmetrically with respect to the vertical plane of symmetry P1 on either side of the longitudinal box 4. The two lower panels 17 extend over the entire length of the fastening system 1 along the axis X. Each of the two lower panels 17 is fastened to the lower formers 10.

Figure 9:
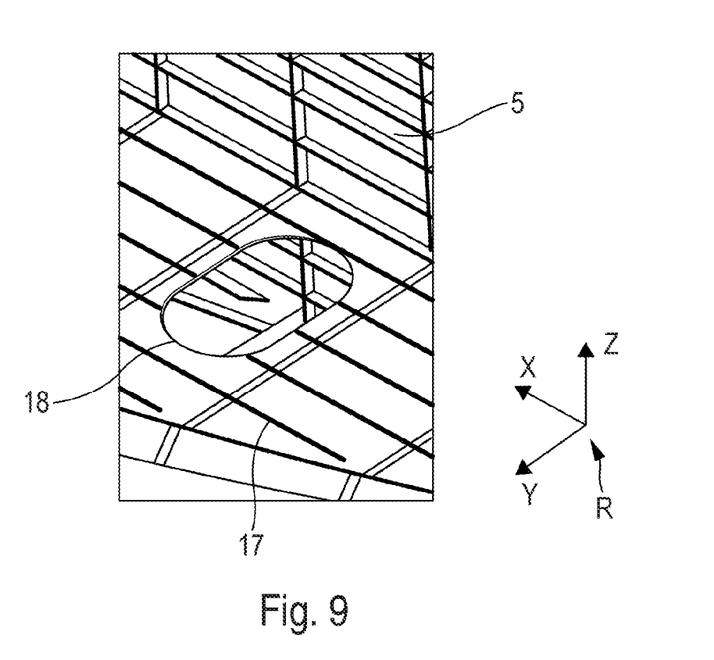
FIG. 9 shows a perspective view of a lower panel.

As shown in FIG. 9, the two lower panels 17 may each comprise at least one manhole 18 configured to allow an operator to pass through on either side of each of the two lower panels 17. The manhole 18 is, preferably, arranged between two lower half-formers 101.

Figure 8:
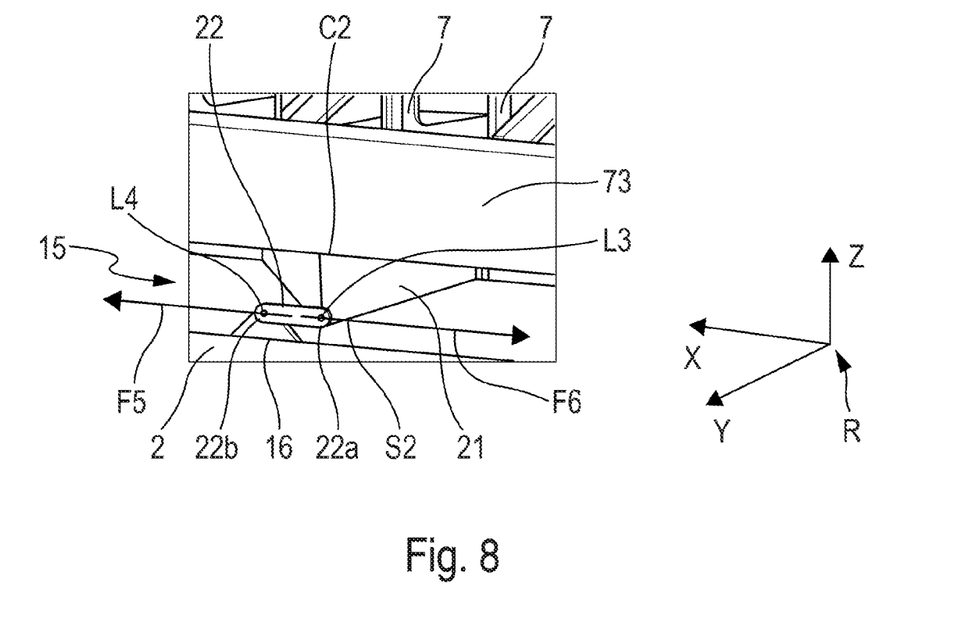
FIG. 8 shows a perspective view of the third fixing device.

The fastening system 1 may comprise at least two third fastening devices fastened to the two upper panels 14 symmetrically with respect to the vertical plane of symmetry P1. The at least two third fastening devices 15 are configured to each connect a respective third fastening point 16 of the tank 2 to a respective upper panel 14. Each of the at least two third fastening devices 15 is configured to permit a transfer of loads F5, F6 along the axis X (FIG. 8).

The third fastening point 16 may be comprised in a plane perpendicular to the axis Y. This plane may be comprised between the vertical plane of symmetry P1 and the plane comprising the first fastening point 9, the two second fastening points 12 and the center of gravity CG of the tank 2.

Advantageously, the fastening system 1 further comprises two upper longerons 73 extending parallel to the axis X and disposed symmetrically on either side of the vertical plane of symmetry P1. Each of the upper formers 7 has a longitudinal end on each side of the vertical plane of symmetry P1. Each of the two upper longerons 73 is fastened to each end of the upper formers 7 that is situated on the same side of the vertical plane of symmetry P1. The two upper longerons 73 extending along the axis X while conforming to an inner surface of an upper shell 27 of the fuselage body 3 of the aircraft AC.

The two upper longerons 73 can serve as reference for positioning the fastening devices 9 and 15 which take up the tank 2.

Advantageously, the fastening system 1 further comprises two lower longerons 13 extending parallel to the axis X and disposed symmetrically on either side of the vertical plane of symmetry P1. Each of the lower formers 10 has a longitudinal end on each side of the vertical plane of symmetry P1. Each of the two lower longerons 13 is fastened to each end of the lower formers 10 that is situated on the same side of the vertical plane of symmetry P1. The two lower longerons 13 extending along the axis X while conforming to an inner surface of a lower shell 33 of the fuselage body 3 of the aircraft AC.

In the remainder of the description, the adjective "double" qualifying an element means that the element comprises two identical single elements coupled to one another. Thus, a double plate comprises two identical single plates coupled to one another. A double link rod comprises two identical single link rods coupled to one another.

The loads exerted on a double element (for example loads exerted by a tank 2) are divided into two load paths: a first part of the loads is exerted on a first single element and a second part of the loads is exerted on the second single element. Thus, if one of the two single elements breaks, the other single element (which is not broken) has the capacity to take up all of the loads. Preferably, the two single elements are not fastened together so that if a first single element were to break, the breakage of this first single element would not lead to the breakage of the second single element.

According to one embodiment, each of the two first fastening devices 8 comprises a double fastening plate 80 perpendicular to the X. The double fastening plate 80 is pierced with an orifice allowing the passage of the pivot axis A2. The double fastening plate 80 of each of the two first fastening devices 8 is fastened to an end of a fastening upper former 7a. Thus, the two first fastening devices 8 of a fastening upper former 7a are fastened to opposite ends of the fastening upper former 7a.

According to one embodiment, each of the two second fastening devices 11 comprises a first triangular double plate 19 and two first double link rods 20 (FIG. 7).

The first triangular double plate 19 is comprised in a vertical plane perpendicular to the axis X. The first triangular double plate 19 has the shape of a triangle having a fastening side C1 and a fastening vertex S1 opposite to the fastening side C1. The first triangular double plate 19 is fastened to a fastening lower former 10a by the fastening side C1.

The two first double link rods 20 are parallel to the axis Y. The two first double link rods 20 have a first end 20a connected to the fastening vertex S1 by a first pivot connection L1 parallel to the axis X. The two first double link rods 20 also have a second end 20b intended to be connected to the tank 2 by a second pivot connection L2 parallel to the axis X.

According to one embodiment, each of the two third fastening devices 15 comprises a second triangular double plate 21 and two second double link rods 22 (FIG. 8).

The second triangular double plate 21 is comprised in a vertical plane perpendicular to the axis Y. The second triangular double plate 21 has the shape of a triangle having a fastening side C2 and a fastening vertex S2 opposite to the fastening side C2. The second triangular double plate 21 is fastened to the upper panel 14 by the fastening side C2.

The two second double link rods 22 are parallel to the axis X. The two second double link rods 22 have a first end 22a connected to the fastening vertex S2 by a first pivot connection L3 parallel to the axis Y. The two second double link rods 22 have a second end 22b intended to be connected to the tank 2 by a second pivot connection L4 parallel to the axis Y.

According to one embodiment, the longitudinal box 4 may comprise at least two longitudinal plates 5, 6 that are parallel to the vertical plane of symmetry P1 and that are symmetrical with respect to the vertical plane of symmetry P1. The two longitudinal plates 5, 6 extend over the entire length of the fastening system 1 along the axis X and over the entire height of the fastening system 1 along the axis Z.

According to one embodiment, each of the upper formers 7 may comprise a pair of upper half-formers 71 fastened to the longitudinal box 4 symmetrically on either side of the vertical plane of symmetry P1. Each of the upper formers 7 may also comprise an upper former center 72 fastened between the upper half-formers 71 and between the two longitudinal plates 5, 6. For each of the upper formers 7, the pair of upper half-formers 71 and the upper former center 72 are comprised in the same plane perpendicular to the axis X.

Each of the two first fastening devices 8 may be configured to connect a respective first fastening point 9 of the tank 2 to an upper half-former 71. For example, each of the two first fastening devices 8 is disposed at an end of an upper half-former 71 in the direction away from the longitudinal box 4.

Advantageously, each of the two upper longerons 73 is fastened to the spacer 25 of each of the upper half-formers 71 that is situated on the same side of the vertical plane of symmetry P1.

According to one embodiment, each of the lower formers 10 may comprise a pair of lower half-formers 101 fastened to the longitudinal box 4 symmetrically on either side of the vertical plane of symmetry P1. Each of the lower formers 10 may also comprise a lower former center 102 fastened between the lower half-formers 101 and between the two longitudinal plates 5, 6. For each of the lower formers 10, the pair of lower half-formers 101 and the lower former center 102 are comprised in the same plane perpendicular to the axis X.

Each of the two second fastening devices 11 may be configured to connect a respective second fastening point 12 of the tank 2 to a lower half-former 101 of a fastening lower former 10a.

According to one embodiment, the upper half-former 71 of each of the pairs of upper half-formers 71 comprises, in a vertical plane perpendicular to the vertical plane of symmetry P1: a vertical upright 23, a horizontal crossmember 24, a spacer and a curved beam 26.

The vertical upright 23 is fastened to a longitudinal plate 5, 6 of the longitudinal box 4.

The curved beam 26 is configured to conform to the inner surface of the upper shell 27 of the fuselage body 3 of the aircraft AC. The curved beam is also configured to be fastened to the inner surface.

The curved beam 26 extends from the upper end of the vertical upright 23 while following the inner surface of the upper shell 27. The horizontal crossmember 24 extends parallel to the axis Y from the lower end of the vertical upright 23.

The curved beam 26 and the horizontal crossmember 24 approach one another in the direction away from the longitudinal box 4 and are connected to one another by way of the spacer 25.

Advantageously, each of the two upper longerons 73 is fastened to the spacer 25 of each of the upper half-formers 71 that is situated on the same side of the vertical plane of symmetry P1.

The upper former center 72 of each of the upper formers 7 has a rectangular shape. It may correspond to a rectangular frame. The upper former center 72 has two opposite sides 28, an upper side 29 and a lower side 30. The two opposite sides are fastened respectively to a longitudinal plate 5, 6 of the longitudinal box 4 such that an upper end of the vertical upright 23 is at the height of the upper side 29 of the upper former center 72 and a lower end of the vertical upright 23 is at the height of the lower side 30 of the upper former center 72. In this embodiment, each of the two upper panels 14 may be fastened to the horizontal crossmember 24 of each of the upper half-formers 71 that are situated on the same side of the vertical plane of symmetry P1.

According to one embodiment, the lower half-former 101 of each of the pairs of lower half-formers 101 comprises, in a vertical plane perpendicular to the vertical plane of symmetry P1: a horizontal crossmember 31 and a curved beam 32.

The lower former center 102 of each of the lower formers 10 has a rectangular shape. It may correspond to a rectangular frame. The lower former center 101 has an upper side 35, a lower side 34 and two opposite sides 36. The two opposite sides 36 are fastened respectively to a longitudinal plate 5, 6 of the longitudinal box 4 between the two longitudinal plates 5, 6.

The curved beam 32 has a first end fastened to a longitudinal plate 5, 6 of the longitudinal box 4 at the height of a lower side 34 of the lower former center 102. The curved beam 32 is configured to extend from its first end while conforming to the inner surface of the lower shell 33 of the fuselage body 3 of the aircraft AC. The curved beam 32 is also configured to be fastened to the inner surface.

The horizontal crossmember 31 has a first end fastened to the longitudinal plate 5, 6 of the longitudinal box 4 at the height of an upper side 35 of the lower former center 102. The horizontal crossmember 31 is configured to extend from its first end parallel to the axis Y.

The curved beam 32 and the horizontal crossmember 31 approach one another in the direction away from their respective first end and are connected to one another at their second end by way of the lower longeron 13 situated on the same side of the vertical plane of symmetry P1.

Advantageously, each of the two lower longerons 13 is fastened to the second end of the curved beam 32 and the second end of the horizontal crossmember 31 of each of the lower half-formers 101 that is situated on the same side of the vertical plane of symmetry P1.

In this embodiment, each of the two lower panels 17 may be fastened to the horizontal crossmember 31 of each of the lower half-formers 101 that are situated on the same side of the vertical plane of symmetry P1.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fastening system that is configured to fasten at least one tank to contain liquid hydrogen, is integrated into a fuselage body of an aircraft, is linked to an orthogonal frame of reference defined by an axis X to be parallel to a longitudinal axis of the fuselage body, a horizontal axis Y, and a vertical axis Z, and has a vertical plane of symmetry perpendicular to the axis Y, the fastening system comprising:
a longitudinal box extending parallel to the axis X and having a plane of symmetry that is coincident with the vertical plane of symmetry;
a plurality of upper formers that are perpendicular to the axis X and fastened to an upper end of the longitudinal box, wherein:
the upper formers of the plurality of upper formers are distributed along the axis X:
the plurality of upper formers comprise at least two fastening upper formers, each of which has two fastening devices on either side of the longitudinal box in order to each connect a first fastening point of at least one tank to the at least two fastening upper formers at a pivot axis that is parallel to the axis X; and
the pivot axis is in a plane that is perpendicular to the axis Y and comprises a center of gravity of the at least one tank; and
a plurality of lower formers that are perpendicular to the axis X and fastened to a lower end of the longitudinal box, wherein:
the lower formers of the plurality of lower formers are distributed along the axis X;
the plurality of lower formers comprise at least one fastening lower former, which has two second fastening devices on either side of the longitudinal box in order to each connect a second fastening point of the at least one tank to the at least one fastening lower former;
the first fastening point and the second fastening point of a tank of the at least one tank is being capable of being comprised in a plane that is perpendicular to the axis Y and comprises the center of gravity of the at least one tank;
wherein each of the two second fastening devices comprises:
a first triangular double plate comprised in a vertical plane perpendicular to the axis X, the first triangular double plate being fastened to a fastening lower former by a fastening side of the first triangular double plate, the fastening side being opposite to a fastening vertex of the first triangular double plate; and
two first double link rods parallel to the axis Y, the two first double link rods having a first end connected to the fastening vertex by a first pivot connection of axis X, the two first double link rods having a second end to be connected to the tank by a second pivot connection of axis X.

2. The system according to claim 1, comprising two upper panels extending parallel to the axis X and perpendicular to the axis Z, the two upper panels being disposed symmetrically with respect to the vertical plane of symmetry on either side of the longitudinal box, each of the two upper panels being fastened to the upper formers.

3. The system according to claim 2, comprising at least two third fastening devices fastened to the two upper panels symmetrically with respect to the vertical plane of symmetry, a first of the at least two third fastening devices being configured to connect a third fastening point of one of the at least one tank to an upper panel and a second of the at least two third fastening devices being configured to connect a third fastening point of another of the at least one tank to the upper panel.

4. The system according to claim 3, wherein each of the at least two third fastening devices comprises:
a second triangular double plate comprised in a vertical plane perpendicular to the axis Y, the second triangular double plate being fastened to the upper panel by a fastening side of the second triangular double plate, the fastening side being opposite to a fastening vertex of the second triangular double plate; and
two second double link rods parallel to the axis X, the two second double link rods having a first end connected to the fastening vertex by a first pivot connection of axis Y, the two second double link rods having a second end to be connected to the tank by a second pivot connection of axis Y.

5. The system according to claim 1, comprising two lower panels extending parallel to the axis X and perpendicular to the axis Z, the two lower panels being disposed symmetrically with respect to the vertical plane of symmetry on either side of the longitudinal box, each of the two lower panels being fastened to the lower formers.

6. The system according to claim 1, wherein the fastening system comprises two upper longerons extending parallel to the axis X and disposed symmetrically on either side of the vertical plane of symmetry, each of the upper formers having a longitudinal end on each side of the vertical plane of symmetry, each of the two upper longerons being fastened to each end of the upper formers that is situated on a same side of the vertical plane of symmetry.

7. The system according to claim 1, wherein the fastening system comprises two lower longerons extending parallel to the axis X and disposed symmetrically on either side of the vertical plane of symmetry, each of the lower formers having a longitudinal end on each side of the vertical plane of symmetry, each of the two lower longerons being fastened to each end of the lower formers that is situated on a same side of the vertical plane of symmetry.

8. The system according to claim 1, wherein each of the two first fastening devices comprises a double fastening plate perpendicular to the axis X, the double fastening plate is pierced with an orifice allowing passage of the pivot axis, the double fastening plate being fastened to an end of a fastening upper former.

9. The system according to claim 1, wherein the longitudinal box comprises at least two longitudinal plates that are parallel to the vertical plane of symmetry and that are symmetrical to one another with respect to the vertical plane of symmetry.

10. The system according to claim 1, wherein:
each of the upper formers comprises a pair of upper half-formers fastened to the longitudinal box symmetrically on either side of the vertical plane of symmetry and an upper former center fastened between the upper half-formers and between the two longitudinal plates; and
each of the lower formers comprises a pair of lower half-formers fastened to the longitudinal box symmetrically on either side of the vertical plane of symmetry and a lower former center fastened between the lower half-formers and between the two longitudinal plates.

11. The system according to claim 10, wherein:
the upper half-former of each of the pairs of upper half-formers comprises, in a vertical plane perpendicular to the vertical plane of symmetry, a vertical upright, a horizontal crossmember, a spacer and a curved beam,
the vertical upright is fastened to a longitudinal plate of the longitudinal box, the curved beam extending from the upper end of the vertical upright,
the curved beam is configured to conform to an inner surface of an upper shell of the fuselage body of the aircraft and to be fastened to the inner surface,
the horizontal crossmember extends from the lower end of the vertical upright,
the curved beam and the horizontal crossmember approaching one another in a direction away from the longitudinal box and are connected to one another by way of the spacer,
each of the two upper longerons is fastened to the spacer of each of the upper half-formers that is situated on a same side of the vertical plane of symmetry,
each of the two upper panels is fastened to the horizontal crossmember of each of the upper half-formers that are situated on a same side of the vertical plane of symmetry, and
the upper former center of each of the upper formers comprises a rectangular shape, two opposite sides of which are fastened respectively to a longitudinal plate of the longitudinal box such that an upper end of the vertical upright is at a height of an upper side of the upper former center and a lower end of the vertical upright is at a height of a lower side of the upper former center.

12. The system according to claim 10, wherein:
the lower half-former of each of the pairs of lower half-formers comprises, in a vertical plane perpendicular to the vertical plane of symmetry, a horizontal crossmember and a curved beam;
the lower former center of each of the lower formers comprises a rectangular shape, two opposite sides of which are fastened respectively to a longitudinal plate of the longitudinal box between the two longitudinal plates;
the curved beam comprises a first end fastened to a longitudinal plate of the longitudinal box at a height of a lower side of the lower former center, the curved beam being configured to conform to an inner surface of a lower shell of the fuselage body of the aircraft and to be fastened to the inner surface;
the horizontal crossmember comprises a first end fastened to the longitudinal plate of the longitudinal box at a height of an upper side of the lower former center,
the curved beam and the horizontal crossmember approaching one another in a direction away from their respective first end and are connected to one another at their second end by the lower longeron situated on a same side of the vertical plane of symmetry; and
each of the two lower panels is fastened to the horizontal crossmember of each of the lower half-formers that are situated on a same side of the vertical plane of symmetry.

13. An aircraft comprising a fuselage into which the fastening system according to claim 1 is integrated.

14. The aircraft according to claim 13, comprising at least one tank to contain liquid hydrogen and fastened to the fastening system.

15. A fastening system that is configured to fasten at least one tank to contain liquid hydrogen, is integrated into a fuselage body of an aircraft, is linked to an orthogonal frame of reference defined by an axis X to be parallel to a longitudinal axis of the fuselage body, a horizontal axis Y, and a vertical axis Z, and has a vertical plane of symmetry perpendicular to the axis Y, the fastening system comprising:
- a longitudinal box extending parallel to the axis X and having a plane of symmetry that is coincident with the vertical plane of symmetry;
- a plurality of upper formers that are perpendicular to the axis X and fastened to an upper end of the longitudinal box, wherein:
  - the upper formers of the plurality of upper formers are distributed along the axis X;
  - the plurality of upper formers comprise at least two fastening upper formers, each of which has two fastening devices on either side of the longitudinal box in order to each connect a first fastening point of at least one tank to the at least two fastening upper formers at a pivot axis that is parallel to the axis X; and
  - the pivot axis is in a plane that is perpendicular to the axis Y and comprises a center of gravity of the at least one tank;
- a plurality of lower formers that are perpendicular to the axis X and fastened to a lower end of the longitudinal box, wherein:
  - the lower formers of the plurality of lower formers are distributed along the axis X;
  - the plurality of lower formers comprise at least one fastening lower former, which has two second fastening devices on either side of the longitudinal box in order to each connect a second fastening point of the at least one tank to the at least one fastening lower former;
- the first fastening point and the second fastening point of a tank of the at least one tank is being capable of being comprised in a plane that is perpendicular to the axis Y and comprises the center of gravity of the at least one tank; and
- at least two third fastening devices fastened to the two upper panels symmetrically with respect to the vertical plane of symmetry, a first of the at least two third fastening devices being configured to connect a third fastening point of one of the at least one tank to an upper panel and a second of the at least two third fastening devices being configured to connect a third fastening point of another of the at least one tank to the upper panel;
- wherein each of the at least two third fastening devices comprises:
  - a second triangular double plate comprised in a vertical plane perpendicular to the axis Y, the second triangular double plate being fastened to the upper panel by a fastening side of the second triangular double plate, the fastening side being opposite to a fastening vertex of the second triangular double plate; and
  - two second double link rods parallel to the axis X, the two second double link rods having a first end connected to the fastening vertex by a first pivot connection of axis Y, the two second double link rods having a second end to be connected to the tank by a second pivot connection of axis Y.

* * * * *